United States Patent
Fairchild

[11] 3,766,374
[45] Oct. 16, 1973

[54] DECORATIVE STRUCTURE

[75] Inventor: Shirlee Fairchild, Huntington Beach, Calif.

[73] Assignee: Poly-Optics, Inc., Santa Ana, Calif.

[22] Filed: Apr. 17, 1972

[21] Appl. No.: 244,735

[52] U.S. Cl.............. 240/10 L, 240/1 LP, 240/10 P
[51] Int. Cl............................................... F21p 1/02
[58] Field of Search .............. 240/1 EL, 10 R, 10 P, 240/1 LP, 10 L; 350/96 B

[56] References Cited
UNITED STATES PATENTS

| | | | |
|---|---|---|---|
| 1,440,589 | 1/1923 | Flender | 240/10 P |
| 3,564,233 | 2/1971 | Cox | 240/10 P |
| 1,938,736 | 12/1933 | Berman | 240/10 P |
| 3,641,335 | 2/1972 | Wall | 240/10 P |
| 3,660,590 | 5/1972 | Conant | 350/96 B |

*Primary Examiner*—Samuel S. Matthews
*Assistant Examiner*—Russell E. Adams, Jr.
*Attorney*—Billy A. Robbins et al.

[57] ABSTRACT

A decorative structure having a plurality of flexible optical fibers each having a light-receiving end and a light-emitting end. A structural rod which may be flexible or rigid is positioned adjacent a portion of the optical fibers. A wrapping is provided for securing a portion of the optical fibers to the structural rod. The light-receiving ends of the fibers are positioned near the light path of a light source for illumination of the optical fibers. In addition, a plurality of structural rods may be surrounded by the optical fibers adjacent the light-receiving end of the fibers. A plurality of side branches can be formed from a main branch with each side branch formed of a plurality of optical fibers and one of the rods extending from the main branch of the structure.

7 Claims, 4 Drawing Figures

PATENTED OCT 16 1973 3,766,374

DECORATIVE STRUCTURE

BACKGROUND OF THE INVENTION

1. Field of the Invention

The field of art to which the invention pertains includes the fields of optics, and radiant energy, particularly with respect to light-conducting rods, such as optical fibers, and decorative structures, particularly decorative lights.

2. Description of the Prior Art

The best known prior art is found in U. S. Pat. Nos. 2,227,861; 3,431,410; and 3,564,231; and in U. S. Design Pat. Des. 215,478.

With the advent of the use of optical fibers for decorative purposes, the fibers have been positioned in a bundle and then the light-emitting ends thereof flared outwardly. In U. S. Pat. No. 3,532,874. assigned to the assignee of the present application, there is depicted a decorative structure having a plurality of optical fibers with the fibers each having a light-receiving and light-emitting end. Telescopically positioned tubular members encase a number of the elongated fibers. The outer fibers flare outwardly from the juncture of the tubular members to form a tier of flared fibers of decreasing extent. The decorative structure of the prior art allows the integrity of a long bundle of fibers to be maintained, while simultaneously intermediate portions thereof are allowed to spray or spill outwardly.

Optical fibers utilized in the decorative medium may be placed into a plurality of very aesthetically pleasing shapes and forms. However, in formation of optical fibers when initially drawn, a memory is usually imparted to them. Thus, even though the optical fibers are placed into a predetermined desirable position, they will not retain that position and immediately upon being released, will return to the preset memory-determined position established at the time of original formation of the fibers. In the event the fibers are quite fine, they may have no preset memory but will randomly fall in a non-oriented fashion. As a result, the utilization of the optical fibers in the decorative arts has heretofore been extremely limited.

SUMMARY OF THE INVENTION

The present invention provides a means for imparting desired forms to the optical fibers which don't conform to the natural memory thereof. The fibers may thus be placed in any desired position prior to flaring outwardly of the light-emitting ends of the fibers. In addition, the structure may provide a plurality of branches each containing a plurality of optical fibers, each of the branches being adjustable for achieving a desired overall effect.

More particularly, the decorative structure comprises a plurality of flexible optical fibers each having a light-receiving end and a light-emitting end. At least one structural rod is positioned adjacent a portion of the optical fibers. Securing means retains the optical fibers positioned adjacent the structural rod. A plurality of structural rods may be provided which are surrounded by the optical fibers adjacent the light-receiving ends of the fibers. A plurality of side branches may be formed which extend from the main branch and each of the side branches may comprise at least one of the structural rods and a plurality of optical fibers secured adjacent thereto. The light-receiving ends of the optical fibers are positioned in the light path of a light source for illumination of the optical fibers.

DESCRIPTION OF THE PREFERRED EMBODIMENTS

Figure 1:
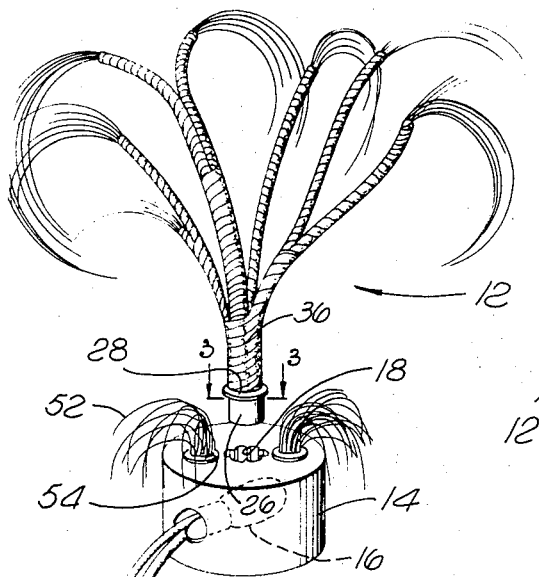
FIG. 1 is a perspective view in partially exploded form of the decorative structure made in accordance with the invention.

Referring now to the drawings, there is shown in FIG. 1 a perspective view of a preferred embodiment of the decorative structure shaped in a form suggestive of a dwarfed tree. The decorative structure 12 is adapted to be positioned in a conventional base member 14 having a light source 16 therein. An opening 18 is formed in the base 14 to position the light-emitting ends of the optical fibers adjacent the light source.

Figure 3:
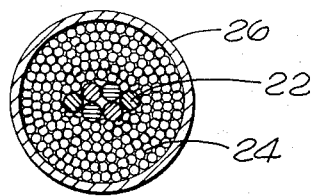
FIG. 3 is a cross-sectional view taken about the lines 3—3 of FIG. 1.
Figure 4:
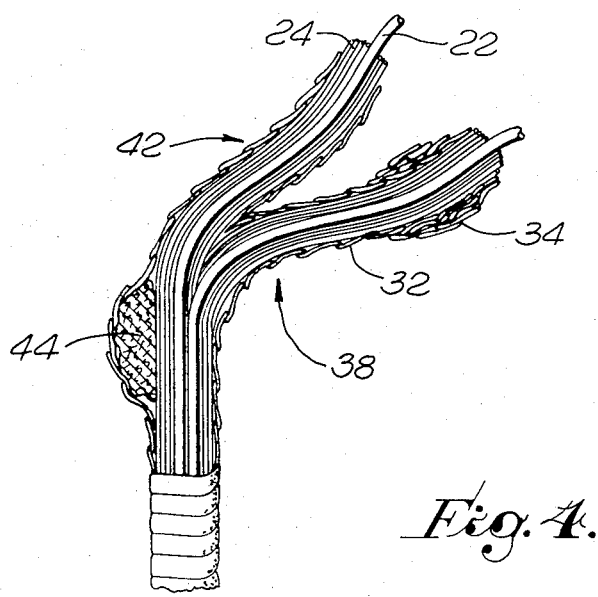
FIG. 4 is a cross-sectional fragmentary view of a pair of branches which are formed from the main branch of the decorative structure.

The decorative structure 12 is shown in greater detail in the cross-sectional views of FIGS. 3 and 4. The decorative structure is formed at its base of a central core of structural material such as solid rods 22 which may typically be of copper, lead, aluminum, steel, etc. Each of the rods 22 are sturdy, yet flexible, and thus, may be bent into a predetermined position and remain in that position. As a result thereof, any optical fibers which may be secured to the rods will retain the position as determined by the rod. It will also be noted that the rods may from time to time be changed and placed into a different position from that previously occupied. As a result, the overall aesthetic appearance of the structure may be changed at will. In each instance, the central core of structural material therefore has no memory and thus will retain any position into which it is placed. It also has a modulus of elasticity such that it may be moved a plurality of times and easily shaped without rupture. If desired, the structural rod may be formed of a rigid material having the desired shape for the decorative structure. In that event, reshaping thereof would not be possible but more complex forms may be fabricated for example from molded plastics or the like.

Surrounding the plurality of rods is a gathered bundle of optical fibers 24. Preferably both the optical fibers and all of the rods are surrounded at the base thereof by an eyelet type member 26 which is crimped to secure the same in place and securely hold the fibers and rods together. However, some of the rods may have the ends thereof positioned above the eyelet 26. The outer diameter of the eyelet 26 is such as to cooperate with the opening 18 formed in the base 14 and support the structure 12 in an upright position. The eyelet 26 may also include a flange 28 for limiting the downward travel of the structure 12 into the base 14. Although the flange 28 is illustrated, it will be recognized by those skilled in the art that any position-limiting member may be utilized including an inwardly directing flange positioned in the opening 18 of the base 14 should such be desired.

The optical fibers 24 may be constructed of glass or plastic but preferably are of the type as described in U. S. Pat. No. 3,532,874 and comprise a central light-conducting core which is encased within a reflecting jacket although the jacket may be dispensed with. The optical fibers are constructed of materials well known in the art wherein the light-conducting core has a higher index of refraction thatn the jacket. For example, a core can be formed of polystyrene having an index of refraction of 1.60 and the jacket can be formed of polymethylmethacrylate ahving an index of refraction of 1.49. Methods for forming such fibers are well known in the art. A balance must be struck between flexibility of the optical fibers and light-emitting capabilities. It has been found that the fiber must be sufficiently flexible to allow formation of decorative spray shapes in a variety of forms. Simultaneously, the fibers must emit sufficient light to be aesthetically pleasing. To obtain an aesthetically attractive display, optical fibers desirably have a diameter of at least 7 mils.

Surrounding the wires 22 and the optical fibers 24 is a securing means in the form of a self-adhering stretch press-type tape 32. After the tape 32 has been placed around the rods 22 and the wires 24, a final finish wrap 34 is overlayed with a thickness of four to six wraps. The finish wrap 34 prevents the rods and fibers from breaking through the tape 32 and provides a desirable decorative design such as to simulate a tree trunk or the like.

The main trunk 36 of the decorative structure 12 can be separated into branches such as 38 and 42. Each of the branches 38 and 42 contain at least one structural rod 22 and a plurality of the optical fibers 24 surrounding it. In addition, where a branch will contain sub-branches, each of the branches will contain sufficient number of rods for each sub-branch to contain at least one rod to make the sub-branches adjustable. At the point where it is desirable to have the fibers 24 free-flow from a branch, the wraps 32 and 34 are terminated and the end of the structural rod in the branch severed so that only the fibers are exposed. Reality may be provided to the structure by simulating a knot, burl, cut, or other feature thereof. For example, cotton 44 may be inserted between the tape 32 and the fibers 24 to simulate a knot in the tree structure. Moreover, sub-structures formed of only flared fibers 52 secured in eyelets 54 and mounted in the base member 14 can also be provided for decorative purpose.

In forming the decorative structure of the present invention, one preferably commences just above the eyelet 26 by gathering the optical fibers 24 around the rods 22. While holding the thus-gathered optical fibers and rods, the self-adhering tape is secured in place around the outer surface of the optical fibers 24. A sufficient amount of tape may be utilized to secure the fibers to the rods 22. As the position is reached where side branches are to emanate from the main trunk, the desired number of fibers along with the desired number of structural rods is separated from the main group of rods and optical fibers and the tape is wrapped thereabout again in the desired amount to secure the optical fibers in a surrounding fashion with the structural rods. After the decorative structure in the form as desired has thus been constructed utilizing the tape and the various rods with the optical fibers surrounding each, the wrapping 34 is secured in place. Subsequent thereto, the wrapping may be treated with any substance desired to provide the desired texture and external appearance in accordance with the form being constructed.

Alternatively, the tape may be dispensed with and the wrapping be utilized as the sole means for securing the optical fibers adjacent the structural rods and also for providing the desired external appearance. In addition thereto, other types of filler material or coatings such as elastic, rigid or semi-rigid materials like acrylics, paint, paste, or the like, may be utilized. It will be recognized in each instance with such material the fibers may be covered directly with the material or the material may be applied over the tape. In either event, such material will improve the structural integrity of the design and also will improve its overall aesthetic material. The only criteria required in either case is that there be sufficient material and/or wrapping to withstand reshaping of the branches and main trunk of the decorative structure from time to time as desired without exposing the underlying optical fibers and structural rods.

In the decorative structure, as shown, it was found necessary to utilize six structural rods 22 so that each of the six branches of the structure would contain at least one rod. In addition, approximately 200 optical fibers were utilized and separated as desired into each of the branches. In addition to the structure as above described, it will be recognized by those skilled in the art that each of the individual branches of the structure may be separately wrapped throughout its entire structure including the structural rod such as at 22 and the tape and wrapping such as at 32 and 34 as illustrated in FIG. 4. Such a plurality of individual branches would then be gathered and placed into an eyelet such as 26 as shown in FIG. 1 and the base portion thereof would be wrapped such as shown at 36 in FIG. 1 to provide the overall appearance of the structure as assembled and illustrated in FIG. 2 and yet retain the flexibility, aesthetic appearance and overall beauty of the general structure as above described.

Figure 2:
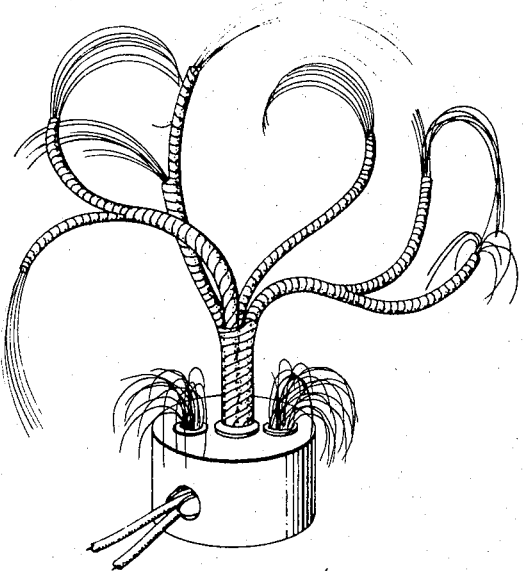
FIG. 2 is a perspective view of the decorative structure of FIG. 1 with the branches thereof in a different position.

Once the branches have been formed they may be bent into a particular desired shape as shown in FIG. 2 and the branches retain this position due to the structural rods 22. In addition, as can be readily seen, the decorative structure could be utilized in combination with a floral arrangement to provide a desired effect.

It should be further understood that the foregoing disclosure relates only to preferred embodiments of the invention, and that it is intended to cover all changes and modifications of the examples of the invention herein chosen for the purpose of the disclosure which do not constitute departures from the spirit and scope of the invention.

What is claimed and desired to be secured by Letters Patent is:

1. A multi-stemmed decorative structure comprising:
   a plurality of flexible optical fibers each having a light receiving end and a light emitting end;
   a plurality of adjustable flexible structural rods positioned adjacent a portion of said optical fibers, said rods being shapable into a first position and reshapable for placement in a second position said rods having sufficient shape retaining pliancy to overcome the natural position memory of said fibers, said rods terminating short of the light emitting end of said fibers;

means for securing a portion of said optical fibers to at least one of said structural rods, each of said rods having fibers secured thereto defining a branch of said multi-stemmed structure ;

a light source; and means for positioning the light receiving ends of said optical fibers in the light path of said light source for illumination of the optical fibers.

2. A decorative structure in accordance with claim 1 wherein a plurality of said optical fibers are secured to at least one of said structural rods by means of tape wound around said fibers and said rods for retaining said optical fibers adjacent at the taped portion and wherein said fibers flare away from said rods where said fibers are not taped to said rods.

3. A decorative structure in accordance with claim 1 wherein said rod is a solid rod made of copper or aluminum.

4. A decorative structure in accordance with claim 1 wherein said plurality of structural rods are surrounded by said optical fibers adjacent said light receiving end of said fibers, and tape means are provided for securing said fibers adjacent said rods at said light receiving end to form a main branch.

5. A decorative structure in accordance with claim 4 wherein a plurality of side branches are formed extending from said main branch, each of said side branches comprising at least one of said rods and a plurality of optical fibers adjacent thereto, each of said side branches having a portion of the fibers thereof secured by means of said tape.

6. A decorative structure in accordance with claim 5 wherein said structural rod and said tape are terminated at a point displaced from the opposite ends of said fibers.

7. A decorative structure in accordance with claim 1 wherein at least one of said branches defined by a structural rod and fibers extend along an axis in a first predetermined direction said rods being shapable to position said fibers and structural rods along a second axis formed at a discrete angle with respect to said first axis.

* * * * *